United States Patent Office 3,781,262
Patented Dec. 25, 1973

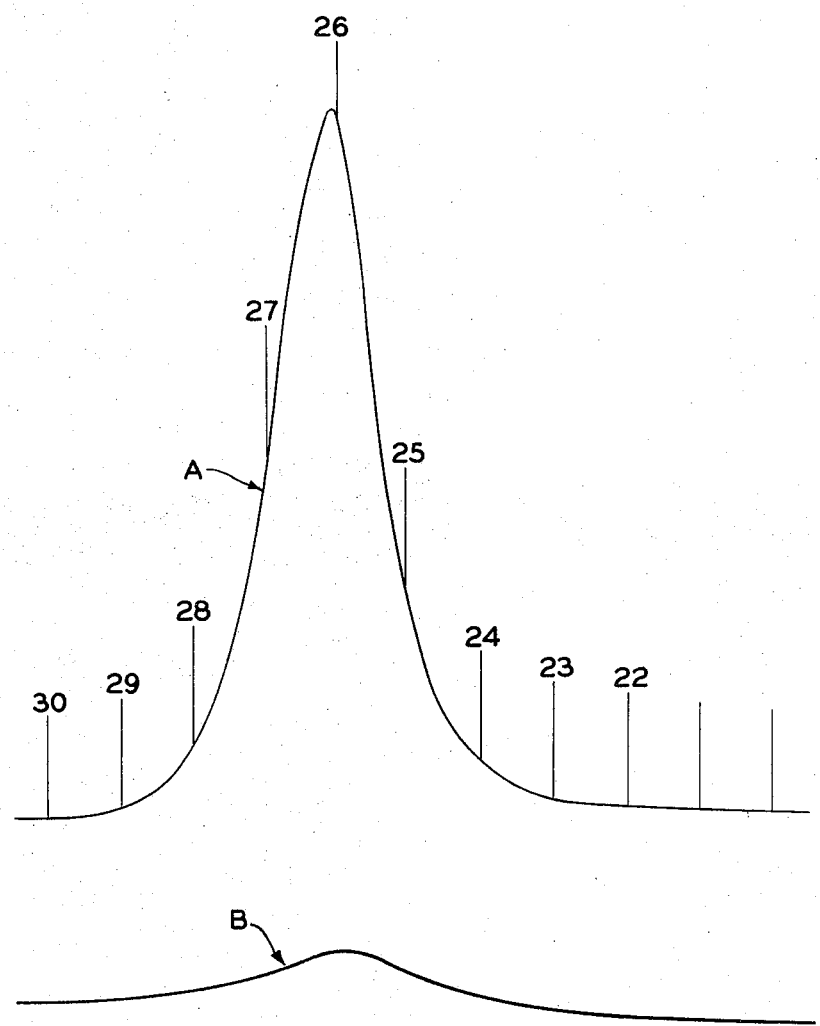

3,781,262
PROCESS FOR METALATION
Adel F. Halasa, Bath, and Mark L. Stayer, Suffield, Ohio, assignors to The Firestone Tire & Rubber Company, Akron, Ohio
Filed Feb. 4, 1972, Ser. No. 223,620
Int. Cl. C08d 5/02
U.S. Cl. 260—94.7 A                     2 Claims

ABSTRACT OF THE DISCLOSURE

Polymers and copolymers of conjugated dienes (butadiene, isoprene, etc.) and copolymers of such a conjugated diene with a vinyl aromatic hydrocarbon (styrene, etc.) are metalated with an alkyl lithium, e.g. butyllithium, together with a mixture of (1) a potassium or sodium alkoxide and (2) lithium t-butoxide.

---

The invention relates to a novel method of metalating rubber homopolymers and copolymers of conjugated dienes containing 4 to 6 carbon atoms, and copolymers of one or more such conjugated dienes with one or more vinyl aromatic monomers. The copolymers may be either random copolymers or block copolymers. The metalated products may be used where other metalated polymers have been used, as in the production of hydrocarbons by reaction with a metal halide, and they may have other uses.

The metalation of such rubbers with butyllithium and a polar compound, e.g. an ether or amine, etc. is disclosed in Naylor 3,492,369. Forman 3,607,851 discloses the polymerization (but not the metalation) of such rubbers with alkoxides. Polymerization is also disclosed in Wofford 3,294,768 which uses (1) an organolithium compound and (2) a selected organic compound of sodium, potassium, rubidium or cesium. Strobel 3,331,821 utilizes an organosodium hydrocarbon with a lithium alkoxide for polymerizing.

In the metalation of rubbers by known procedures, the rubber is depolymerized as evidenced, for instance, by loss of resistance to cold flow and loss in molecular weight. Such loss is prevented or reduced by using a mixture of (1) alkyllithium (preferably n-butyllithium), (2) a potassium or sodium alkoxide (preferably a t-amylate or menthylate) and (3) a lithium alkoxide (preferably t-butoxide). Thus, for each 100 parts by weight of polymer there are used: 0.001 to 2 parts (and preferably 0.001 to 0.05 part) of lithium as alkyllithium which contains 4 to 8 carbon atoms; 0.01 to 20 parts (and preferably 0.1 to 10 parts) of potassium or sodium as alkoxide which contains 1 to 10 carbon atoms; and 0.05 to 20 parts (and preferably 0.5 to 10 parts) of lithium as lithium alkoxide which contains 1 to 10 carbon atoms.

The metalated polymers and copolymers are useful for the production of graft copolymers, and for this purpose it is immaterial whether lithium or potassium or sodium or a mixture of these metals constitutes the metal of the metalated rubber. The grafts can be formed by reacting the metalated polymer or copolymer of this invention with an alkyl halide, etc.

The metalation is carried out at any usual metalating temperature such as 0° to 150° C. A preferred temperature range is 25° to 50° C. The solvent used is a solvent such as a hydrocarbon aliphatic solvent, usually employed in the polymerization of monomers in the production of rubber using butyllithium as the catalyst. Such solvents are saturated paraffinic hydrocarbons or aliphatic cyclo hydrocarbons containing 5 to 10 carbon atoms. Potassium and sodium t-amylates and menthylates are soluble in aliphatic cyclic hydrocarbons as are butyllithium and lithium t-butoxide. The reaction is advantageously carried out in an aliphatic cyclic saturated hydrocarbon containing 5 to 10 carbon atoms and cyclohexane is preferred for commercial operations in which more concentrated solutions are utilized. This permits a great saving in plant investment, and it permits continuous operation which is also highly desirable.

It has been recognized that rubber polymers lose molecular weight during the known metalation reactions. See, for instance, Metalation of Unsaturated Polymers and Formation of Graft Polymers by authors which include one of the co-inventors, published in the Journal of Polymer Science, Part A-1, vol. 9, pages 139-45 (1971). On page 142 there is a table which shows that during metalation there is loss in the molecular weight of polybutadiene and isoprene with resultant decrease in intrinic viscosity. The article refers to low metalation levels, but there is also a loss in molecular weight with higher metalation levels. Also, when potassium t-amylate is used along with butyllithium, the polymers and compolymers are degraded. This is shown by the following table in which the amount of each additive is given in terms of millimoles and also the number of grams per 100 grams of butadiene used. The reactions were carried out using 100 grams of butadiene per 560 grams of hexane. The last column refers to the percent of bound styrene found in the product, a determination made merely to determine the extent of the metalation. Sodium t-amylate and the menthylates give like results.

TABLE I
Production of metalated polybutadiene

| Sample | K-t-amylate | | Li-t-butoxide | | n-BuLi/100 gr. | | Percent styrene added | Percent styrene grafted |
|---|---|---|---|---|---|---|---|---|
| | Mm. | Gr. | Mm. | Gr. | Mm. | Gr. | | |
| A | 10.00 | 1.12 | 10.00 | 0.068 | 2.00 | 0.014 | 20.00 | 4.1 |
| B | 10.00 | 1.12 | 10.00 | 0.068 | 4.00 | 0.028 | 20.00 | 6.3 |
| C | 10.00 | 1.12 | 10.00 | 0.068 | 6.00 | 0.042 | 20.00 | 7.8 |
| D | 10.00 | 1.12 | 10.00 | 0.068 | 8.00 | 0.056 | 20.00 | 13.6 |
| E | 10.00 | 1.12 | 10.00 | 0.068 | 10.00 | 0.07 | 20.00 | 17.3 |
| F | 4.00 | 0.448 | 4.00 | 0.027 | 2.00 | 0.014 | 20.00 | 3.8 |
| G | 8.00 | 0.896 | 8.00 | 0.054 | 4.00 | 0.028 | 20.00 | 9.1 |
| H | 12.00 | 1.34 | 12.00 | 0.081 | 6.00 | 0.042 | 20.00 | 8.1 |
| I | 16.00 | 1.80 | 16.00 | 0.108 | 8.00 | 0.056 | 20.00 | 12.8 |

The advantage of using lithium t-butoxide or other lithium alkoxide with potassium or sodium t-amylate or menthylate or other alkoxide and n-butyllithium or other alkyl lithium is that loss of active lithium in the polymer is minimized. Active lithium is defined as the lithium which enters into the initiation step for formation of polymer. One reason for using a lithium alkoxide such as t-butoxide is that live ends are retained in the polymer for further grafting. Without the presence of such lithium alkoxide, KH or NaH is eliminated from the metalated polymer and this leads to dead polymer. This phenomena is illustrated by the appearance of conjugated diene structure in the polymer seen from the ultra-violet tracing in the G.P.C. curve, as illustrated in the drawing.

In the drawing, the upper curve A is the curve of the polymer after metalation with Kt-amylate present. The lower curve is the ultraviolet tracing of conjugated diene present due to the loss of metal hydride which resulted from degradation of the polymer.

Another reason for using lithium alkoxide such as lithium t-butoxide is that it slows down the propagation step which follows initiation of the polymerization, and the heat of the reaction is easily dispersed so that the reaction is easily controlled.

Other samples of polybutadiene were made in the usual manner using n-BuLi initiator (0.007 gr. of lithium per 100 gr. of butadiene-1,3). The polymerizations were conducted in hexane solvent at 50° C. for 16 hours.

The metalations of these samples were effected at 50° C. by adding n-BuLi and potassium tert-amylate to the polybutadiene in cyclohexane solution which contains the smaller amount of hexane in which the polymer is dissolved, and continuing the metalation for 5 hours. No lithium alkoxide was added. The data is shown in Table II.

TABLE II
Metalation with n-BuLi-K-t-amylate

| Sample | n-BuLi Mm. | n-BuLi Gr./100 gr. rubber | K-t-amylate Mm. | K-t-amylate Gr./100 gr. rubber |
|---|---|---|---|---|
| A | 4.84 | 0.0033 | 2.42 | 0.090 |
| B | 1.21 | 0.0006 | 0.30 | 0.011 |
| C | 16.20 | 0.1100 | 16.20 | 0.60 |
| D | 1.25 | 0.0006 | 0.63 | 0.022 |

In order to determine the loss of lithium, each sample of metalated polymer in Table II was grafted by adding 11.0 gr. of styrene at 50° C. The styrene blocks formed were oxidized from each sample and the styrene blocks were isolated and their average number molecular weights ($Mn^-$) were determined. The $Mn^-$ determined was compared with $Mn^-$ calculated. In this manner, the loss of active lithium in grafting from the metalation system was determined. The data is tabulated below.

TABLE III
Grafting of metalated rubber with styrene

| Molecular weight of styrene block | | Percent loss of active lithium |
|---|---|---|
| $Mn^-$ calcd. | $Mn^-$ found | |
| 2,070 | 22,000 | 90.60 |
| 8,270 | 22,000 | 80.80 |
| 2,780 | 12,000 | 77 |
| 8,700 | 22,000 | 60.40 |

The data in Table III indicates the loss of lithium activity as indicated by the high molecular weights of isolated styrene blocks. This shows the mixture of n-BuLi and K-tert-amylate alone is not a very effective metalating agent due to the loss of active ends as metal hydride. One would expect if every metal on the backbone is active the calculated $Mn^-$ would be very close to that found experimentally.

The above results were repeated, but lithium tert-butoxide was added at 50° C. to the metalating agents of Table II.

TABLE IV
Metalation with n-BuLi of polybutadiene rubber in hexane

| Sample | n-BuLi Mm. | n-BuLi Gr. Li per 100 gr. rubber | Li-tert-butoxide, gr. Li per 100 gr. rubber | K-amylate, mm. | K-amylate gr. of K per 100 gr. rubber |
|---|---|---|---|---|---|
| A | 4.84 | 0.0033 | 0.068 | 2.42 | 0.090 |
| B | 1.21 | 0.0006 | 0.068 | 0.30 | 0.011 |
| C | 16.20 | 0.1100 | 0.068 | 16.20 | 0.600 |
| D | 1.25 | 0.0006 | 0.068 | 0.63 | 0.022 |

Styrene (11.0 gr.) was added at 50° C. to each metalated polymer sample for grafting. After grafting was completed the polymers were isolated. Block styrene was isolated and the $Mn^-$ (average number molecular weight) was isolated.

TABLE V
Grafting of metalated polybutadiene with styrene

| Sample | Molecular weight of styrene block | | Percent loss of active lithium |
|---|---|---|---|
| | $Mn^-$ calcd. | $Mn^-$ found | |
| A | 2,070 | 3,410 | 39.30 |
| B | 8,270 | 9,000 | 9.12 |
| C | 2,780 | 2,900 | 4.14 |
| D | 8,700 | 10,400 | 15.04 |

On comparing the $Mn^-$ calculated with the $Mn^-$ found, more particularly as shown in the percent loss of active lithium, it is found that much closer agreements were obtained in Table V than in Table III. Table V shows only slight loss of active metalated lithium (15–40%) as compared to the loss recorded in Table III (61–90%). This shows that lithium tert-butoxide stabilizes the metalated rubber, and prevents any great loss of metal hydride before grafting occurs.

The use of sodium t-amylate or sodium or potassium menthylate instead of potassium t-amylate with alkyl lithium and lithium alkoxide gives like results.

We claim:
1. The process of metalating which comprises treating 100 parts by weight of a rubber polymer of the class consisting of (a) homopolymers and copolymers of conjugated dienes containing 4 to 6 carbon atoms and (b) copolymers of one or more such conjugated dienes with one or more vinyl aromatic monomers, with (1) 0.001 to 2 parts of lithium as an alkyl lithium the alkyl group of which contains 4 to 8 carbon atoms, (2) 0.05 to 20 parts of lithium as an alkoxide which contains 1 to 10 carbon atoms and (3) 0.01 to 20 parts of potassium or sodium as an alkoxide which contains 1 to 10 carbon atoms, in solution in a saturated hydrocarbon solvent at 0 to 150° C.

2. The process of claim 1 in which 0.001 to 0.05 part of lithium is used as n-butyllithium, together with 0.5 to 10 parts of lithium as lithium t-butoxide and 0.1 to 10 parts of sodium or potassium as t-amylate or menthylate, using a hydrocarbon solvent which is essentially cyclohexane.

References Cited
FOREIGN PATENTS 873,656    7/1961    Great Britain _____ 260—94.2
1,478,225    3/1967    France _____ 260—877 X
1,144,151    3/1969    Great Britain _____ 260—877 X JOSEPH L. SCHOFER, Primary Examiner W. F. HAMROCK, Assistant Examiner U.S. Cl. X.R.

260—82.1, 85.1